(12) United States Patent
Porter

(10) Patent No.: US 12,433,253 B2
(45) Date of Patent: *Oct. 7, 2025

(54) PET GROOMING TOOL WITH MULTIPLE PET ENGAGEABLE PORTIONS

(71) Applicant: David R. Porter, Ladue, MO (US)

(72) Inventor: David R. Porter, Ladue, MO (US)

( * ) Notice: Subject to any disclaimer, the term of this patent is extended or adjusted under 35 U.S.C. 154(b) by 252 days.

This patent is subject to a terminal disclaimer.

(21) Appl. No.: 17/980,725

(22) Filed: Nov. 4, 2022

(65) Prior Publication Data

US 2023/0058657 A1 Feb. 23, 2023

Related U.S. Application Data

(63) Continuation of application No. 17/667,905, filed on Feb. 9, 2022, now Pat. No. 11,490,594.

(60) Provisional application No. 63/148,428, filed on Feb. 11, 2021.

(51) Int. Cl.
| | | |
|---|---|---|
| *A01K 13/00* | (2006.01) | |
| *A45D 24/04* | (2006.01) | |
| *A46B 5/02* | (2006.01) | |
| *A46D 1/00* | (2006.01) | |

(52) U.S. Cl.
CPC ............ *A01K 13/002* (2013.01); *A45D 24/04* (2013.01); *A46B 5/02* (2013.01); *A46B 2200/1093* (2013.01); *A46D 1/0284* (2013.01)

(58) Field of Classification Search
CPC .... A47K 13/00; A47K 13/001; A47K 13/002; A45D 24/00; A45D 24/04; A45D 24/30; A46B 2200/1093

USPC ....... 132/126, 129, 131, 141, 142, 147, 158, 132/159

See application file for complete search history.

(56) References Cited

U.S. PATENT DOCUMENTS

| 128,632 | A | | 7/1872 | Kellog | |
|---|---|---|---|---|---|
| 1,169,644 | A | | 1/1916 | Hoffman | |
| 5,339,840 | A | * | 8/1994 | Koppel | ................ A01K 13/002 |
| | | | | | 119/633 |
| 6,782,846 | B1 | | 8/2004 | Porter et al. | |
| 7,159,274 | B2 | | 1/2007 | Freidell | |
| D565,258 | S | | 3/2008 | Porter et al. | |
| 7,650,857 | B2 | | 1/2010 | Porter et al. | |
| 7,650,858 | B2 | | 1/2010 | Porter et al. | |
| 8,322,307 | B2 | | 12/2012 | Dionne | |
| 8,528,501 | B2 | | 9/2013 | Prochaska | |
| 8,960,129 | B2 | | 2/2015 | Porter et al. | |
| 9,004,009 | B2 | | 4/2015 | Kissel, Jr. | |

(Continued)

FOREIGN PATENT DOCUMENTS

| KR | 100528817 B1 * | 11/2005 | ............. A45D 24/04 |
|---|---|---|---|
| WO | WO 2015/111138 A1 * | 7/2015 | ............. A45D 24/00 |

OTHER PUBLICATIONS

International Search Report and Written Opinion for International Application No. PCT/US2022/015779 filed Feb. 9, 2022.

*Primary Examiner* — Laura C Guidotti
(74) *Attorney, Agent, or Firm* — Thompson Coburn LLP

(57) ABSTRACT

A pet grooming tool for grooming a furry pet. The pet grooming tool includes a handle portion and at least one pet engageable portion. The handle portion has a head portion, and each pet engageable portion is secured to the head portion. The pet engageable portion comprises a plurality of teeth arranged in a row and a plurality of edge segments with a gap between each adjacent pair of teeth.

10 Claims, 7 Drawing Sheets

(56) References Cited

U.S. PATENT DOCUMENTS

| | | |
|---|---|---|
| 9,060,496 B2 | 6/2015 | Porter et al. |
| 9,386,758 B2 | 7/2016 | Dionne |
| 9,706,753 B2 | 7/2017 | Moeller et al. |
| 9,795,116 B1 | 10/2017 | Czajkowski |
| 10,034,455 B2 | 7/2018 | Murrihy et al. |
| 10,869,543 B2 | 12/2020 | Chang |
| 11,490,594 B2 * | 11/2022 | Porter .................... A46B 9/02 |
| 2005/0150465 A1 | 7/2005 | Dunn et al. |
| 2014/0326192 A1 | 11/2014 | Coupe et al. |
| 2016/0338467 A1 | 11/2016 | Park |
| 2017/0071156 A1 | 3/2017 | Cafasso |

* cited by examiner

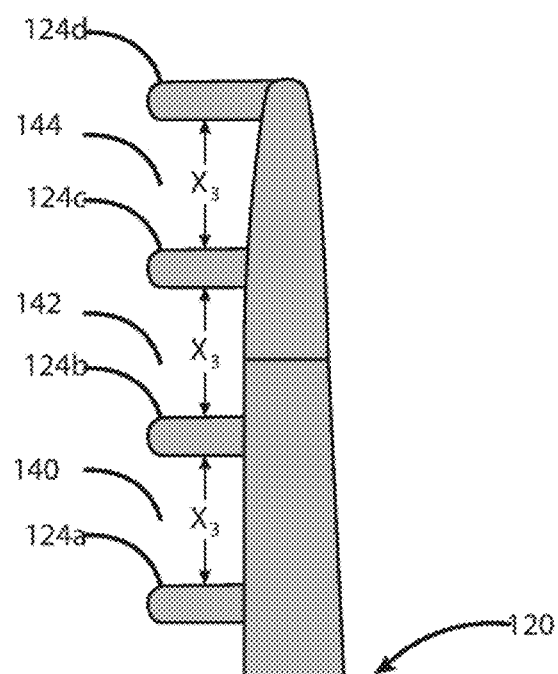
FIG. 10
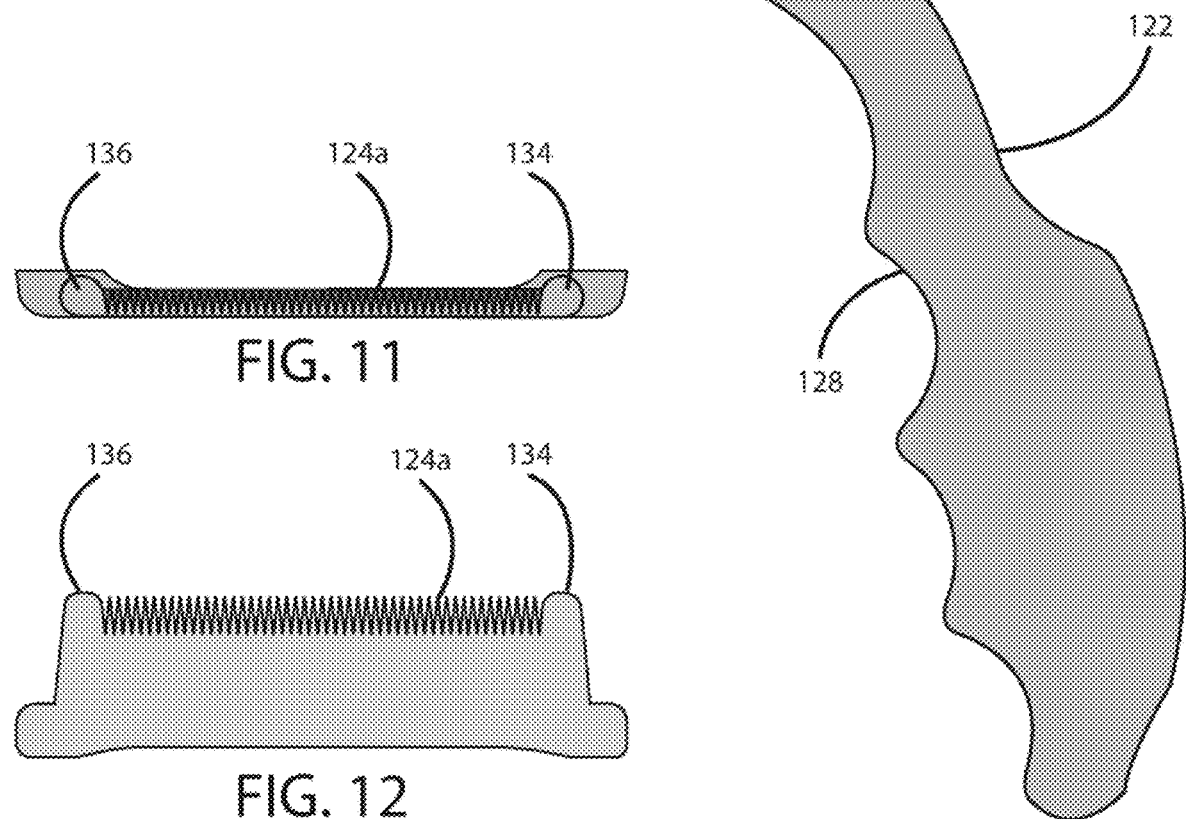
FIG. 11
FIG. 12

PET GROOMING TOOL WITH MULTIPLE PET ENGAGEABLE PORTIONS

CROSS-REFERENCE TO RELATED APPLICATIONS

This application claims the benefit of U.S. application Ser. No. 17/667,905, filed Feb. 9, 2022, which claims the benefit of U.S. provisional application 63/148,428, filed Feb. 11, 2021, the disclosures of each of which are incorporated by reference herein.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

This invention pertains to pet grooming tools for removing loose hair from furry pets.

SUMMARY

One aspect of the disclosure is a pet grooming tool for grooming a furry pet. The pet grooming tool comprises a handle portion and first and second pet engageable portion. The handle portion has a head portion, and the first and second pet engageable portions are secured to the head portion. Each of the first and second pet engageable portions comprises a plurality of teeth arranged in a row and a plurality of edge segments with a gap between each adjacent pair of teeth. The edge segments alternate with the teeth and bridge the gaps between the teeth. Each of the first and second pet engageable portions further comprises a first end guard adjacent a first end of the row of teeth and a second end guard adjacent an opposite second end of the row of teeth such that the plurality of teeth of each of the first and second pet engageable portions are between the first and second end guards of such pet engageable portion. The first and second pet engageable portions protrude from the head portion of the handle portion such that the plurality of teeth of each pet engageable portion project away from the head portion and such that the row of teeth of the second pet engageable portion is parallel to and spaced a distance $X_1$ from the row of teeth of the first pet engageable portion, the distance $X_1$ being at least 0.62 inches (16 mm). The first and second pet engageable portions are positioned and configured to simultaneously engage loose fur in a pet's coat in a manner to remove the loose fur from the pet's coat. The head portion of the handle portion is shaped and configured to enable a user to wipe the first channel with a finger of the user to thereby remove loose fur caught between the first and second pet engageable portions.

Another aspect of the disclosure is a pet grooming tool for grooming a furry pet. The pet grooming tool comprises a handle portion having a head portion, and first and second pet engageable portions secured to the head portion. Each of the first and second pet engageable portions comprises a plurality of teeth arranged in a row and a plurality of edge segments with a gap between each adjacent pair of teeth. The edge segments alternate with the teeth and bridge the gaps between the teeth. Each of the first and second pet engageable portions further comprises a first end guard adjacent a first end of the row of teeth and a second end guard adjacent an opposite second end of the row of teeth such that the plurality of teeth of each of the first and second pet engageable portions are between the first and second end guards of such pet engageable portion. The first and second pet engageable portions protrude from the head portion of the handle portion such that the plurality of teeth of each pet engageable portion project away from the head portion and such that the row of teeth of the second pet engageable portion is parallel to and spaced a distance $X_1$ from the row of teeth of the first pet engageable portion, the first and second pet engageable portions are positioned and configured to simultaneously engage loose fur in a pet's coat in a manner to remove the loose fur from the pet's coat. Each tooth of the plurality of teeth of the first pet engageable portion has a forward surface, a rear surface, a root end, a tip end opposite its root end, and a length from its root end to its tip end. Each of the first and second end guards of the first pet engageable portion has a forward surface, a rear surface, a root end, a tip end opposite its root end, and a length from its root end to its tip end. Each tooth of the plurality of teeth of the second pet engageable portion has a forward surface, a rear surface, a root end, a tip end opposite its root end, and a length from its root end to its tip end. Each of the first and second end guards of the second pet engageable portion has a forward surface, a rear surface, a root end, a tip end opposite its root end, and a length from its root end to its tip end. The forward surfaces of the first and second end guards of the first pet engageable portion are more forward than the forward surfaces of the plurality of teeth of the first pet engageable portion such that a straight line extending from the forward surface of the first end guard of the first pet engageable portion to the forward surface of the second end guard of the first pet engageable portion is forward of and spaced from the forward surface of each of the plurality of teeth of the first pet engageable portion. The rear surfaces of the first and second end guards of the first pet engageable portion are more rearward than the rear surfaces of the plurality of teeth of the first pet engageable portion such that a straight line extending from the rear surface of the first end guard of the first pet engageable portion to the rear surface of the second end guard of the first pet engageable portion is rearward of and spaced from the rear surface of each of the plurality of teeth of the first pet engageable portion. The forward surfaces of the first and second end guards of the second pet engageable portion are more forward than the forward surfaces of the plurality of teeth of the second pet engageable portion such that a straight line extending from the forward surface of the first end guard of the second pet engageable portion to the forward surface of the second end guard of the second pet engageable portion is forward of and spaced from the forward surface of each of the plurality of teeth of the second pet engageable portions. The rear surfaces of the first and second end guards of the second pet engageable portion are more rearward than the rear surfaces of the plurality of teeth of the second pet engageable portion such that a straight line extending from the rear surface of the first end guard of the second pet engageable portion to the rear surface of the second end guard of the second pet engageable portion is rearward of and spaced from the rear surface of each of the plurality of teeth of the second pet engageable portions.

Another aspect of the present invention is a pet grooming tool for grooming a furry pet. The pet grooming tool comprises a handle portion having a head portion, and first and second pet engageable portions secured to the head portion. The first and second pet engageable portions are secured to the head portion. Each of the first and second pet engageable portions comprises a plurality of teeth arranged in a row and a plurality of edge segments with a gap between each adjacent pair of teeth. The edge segments alternate with the teeth and bridge the gaps between the teeth. Each of the first and second pet engageable portions further comprises a first end guard adjacent a first end of the row of teeth and a second end guard adjacent an opposite second end of the row of teeth such that the plurality of teeth of each of the first and second pet engageable portions are between the first and second end guards of such pet engageable portion. The first and second pet engageable portions protrude from the head portion of the handle portion such that the plurality of teeth of each pet engageable portion project away from the head portion and such that the row of teeth of the second pet engageable portion is parallel to and spaced a distance $X_1$ from the row of teeth of the first pet engageable portion. The first and second pet engageable portions are positioned and configured to simultaneously engage loose fur in a pet's coat in a manner to remove the loose fur from the pet's coat. Each tooth of the plurality of teeth of each of the first and second pet engageable portions has a forward surface, a rear surface, a root end, a tip end opposite its root end, a tooth length from its root end to its tip end, a tooth thickness from the forward surface to the rear surface at the root end, and a tooth width at the root end. Each tooth of the plurality of teeth of each of the first and second pet engageable portions have a ratio of the tooth thickness to the tooth length of at least 1/2 and not more than 1/1.

Another aspect of the present invention is a pet grooming tool for grooming a furry pet. The pet grooming tool comprises a handle portion having a head portion, and first and second pet engageable portions secured to the head portion. The first and second pet engageable portions are secured to the head portion. Each of the first and second pet engageable portions comprises a plurality of teeth arranged in a row and a plurality of edge segments with a gap between each adjacent pair of teeth. The edge segments alternate with the teeth and bridge the gaps between the teeth. Each of the first and second pet engageable portions further comprises a first end guard adjacent a first end of the row of teeth and a second end guard adjacent an opposite second end of the row of teeth such that the plurality of teeth of each of the first and second pet engageable portion are between the first and second end guards of such pet engageable portion. The first and second pet engageable portions protrude from the head portion of the handle portion such that the plurality of teeth of each pet engageable portion project away from the head portion and such that the row of teeth of the second pet engageable portion is parallel to and spaced a distance $X_1$ from the row of teeth of the first pet engageable portion. The first and second pet engageable portions are positioned and configured to simultaneously engage loose fur in a pet's coat in a manner to remove the loose fur from the pet's coat. Each tooth of the plurality of teeth of each of the first and second pet engageable portions has a forward surface, a rear surface, a root end, a tip end opposite its root end, a tooth length from its root end to its tip end, a tooth thickness from the forward surface to the rear surface at the root end, and a tooth width at the root end. Each tooth of the plurality of teeth of each of the first and second pet engageable portions has a ratio of the tooth thickness to the tooth width of at least 2/1 and not more than 4/1.

BRIEF DESCRIPTION OF THE DRAWINGS

FIG. 10 is a side view of the pet grooming tool of FIG. 8.

FIG. 11 is a bottom plan view of the first pet engageable portion of the pet grooming tool of FIG. 8, each of the second, third, and fourth pet engageable portions of this embodiments being identical to the first pet engageable portion.

FIG. 12 is a rear view of the pet engageable portion of FIG. 11.

Figure 1:
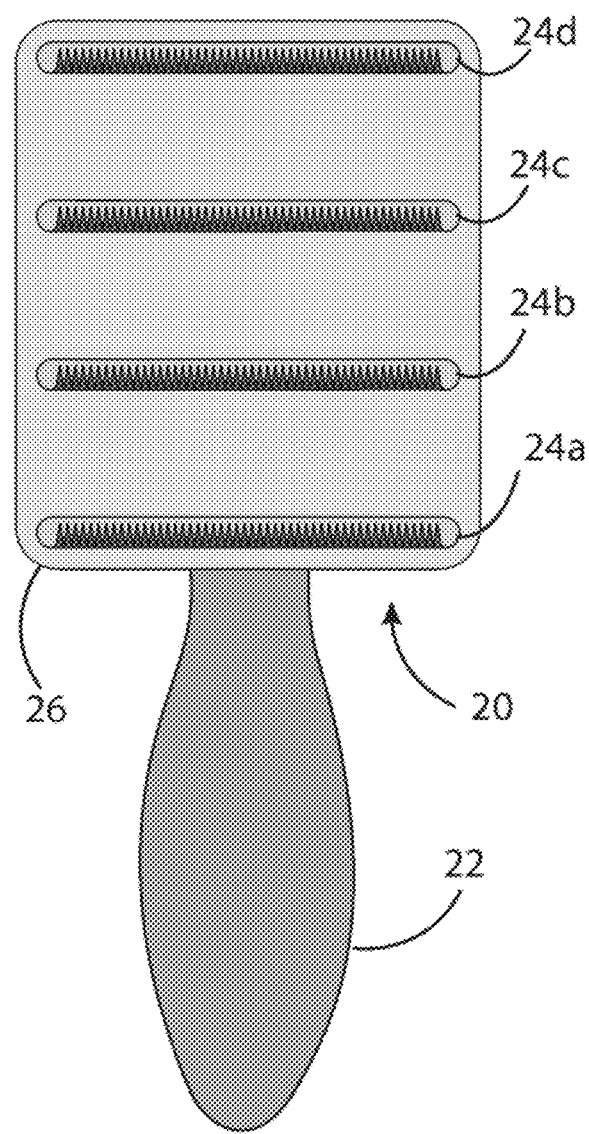
FIG. 1 is a bottom plan view of a pet grooming tool of the present disclosure, the pet grooming tool having first, second, third, and fourth pet engageable portions.
Figure 2:
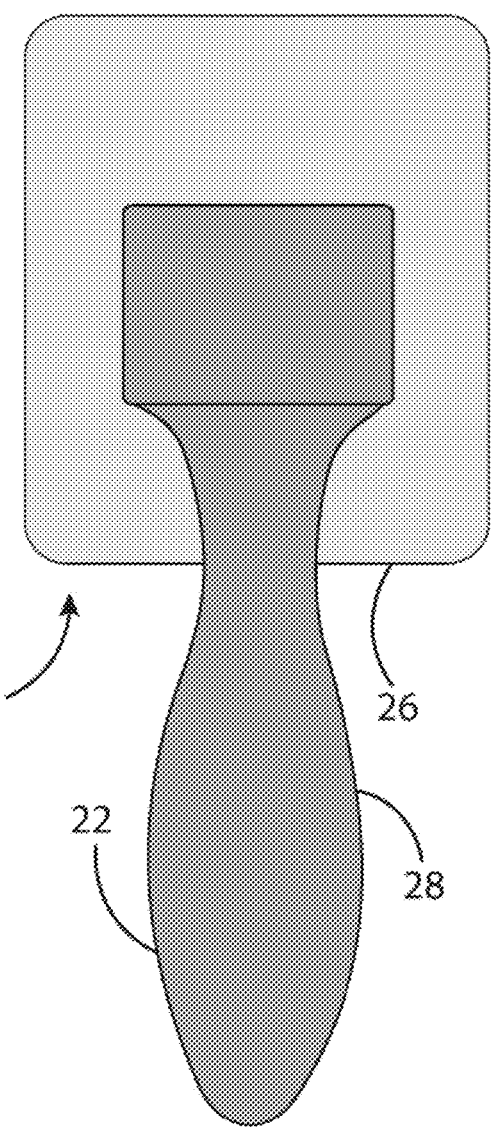
FIG. 2 is a top plan view of the pet grooming tool of FIG. 1.
Figure 3:
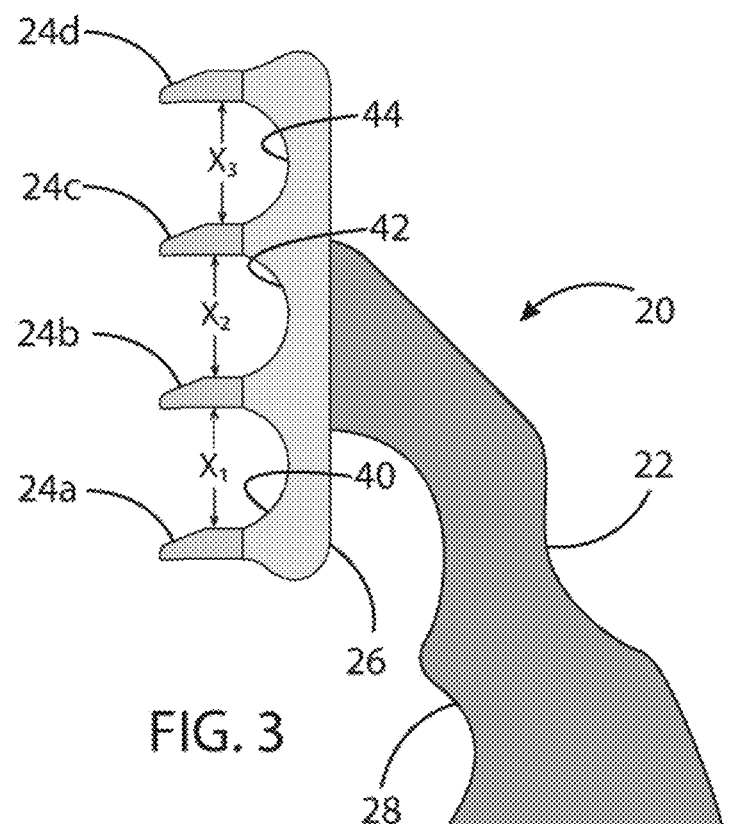
FIG. 3 is a side view of the pet grooming tool of FIG. 1.
Figure 4:
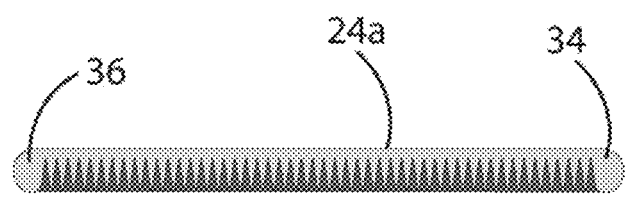
FIG. 4 is a bottom plan view of the first pet engageable portion of the pet grooming tool of FIG. 1, each of the second, third, and fourth pet engageable portions of this embodiment being identical to the first pet engageable portion.
Figure 5:
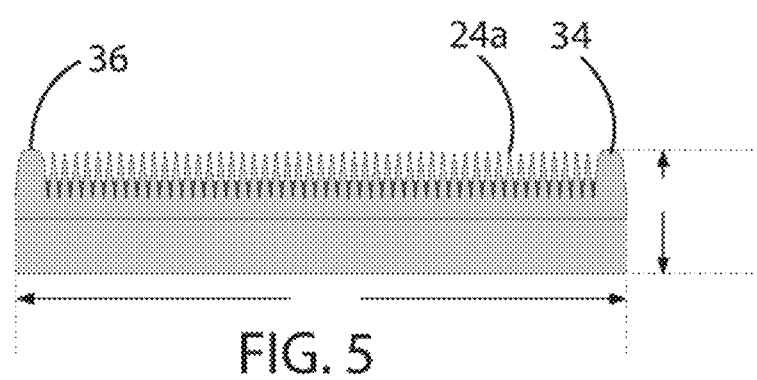
FIG. 5 is a rear view of the pet engageable portion of FIG. 4.

Reference numerals in the written specification and in the drawing figures indicate corresponding items.

DETAILED DESCRIPTION

An embodiment of a pet grooming tool of the present disclosure is indicated generally by reference numeral 20 in FIG. 1. The pet grooming tool 20 comprises a handle portion 22 and first, second, third, and fourth pet engageable portions 24a, 24b, 24c, and 24d. The handle portion 22 has a head portion 26 and an elongate hand grip portion 28 projecting from the head portion. The first, second, third, and fourth pet engageable portions 24a, 24b, 24c, 24d are secured to the head portion 26. Each of the first, second, third, and fourth pet engageable portions 24a, 24b, 24c, 24d may be of metal (e.g., steel), or may be of a polymeric material, preferably a rigid injection-moldable polymeric material such as polycarbonate, acetal, nylon, or HDPE. The handle portion 22 may be of a polymeric material which may be the same polymeric material as that of the first, second, third, and fourth pet engageable portions 24a, 24b, 24c, 24d, or a different polymeric material. The first, second, third, and fourth pet engageable portions 24a, 24b, 24c, 24d, may each be of a molded construction. The first, second, third, and fourth pet engageable portions 24a, 24b, 24c, 24d, collectively with the handle portion 22, may be a single, unitary, homogenous piece. Alternatively, the first, second, third, and fourth pet engageable portions 24a, 24b, 24c, 24d, and the handle portion, may each be formed separately and then assembled together as the pet grooming tool 20.

Figures 6, 7:
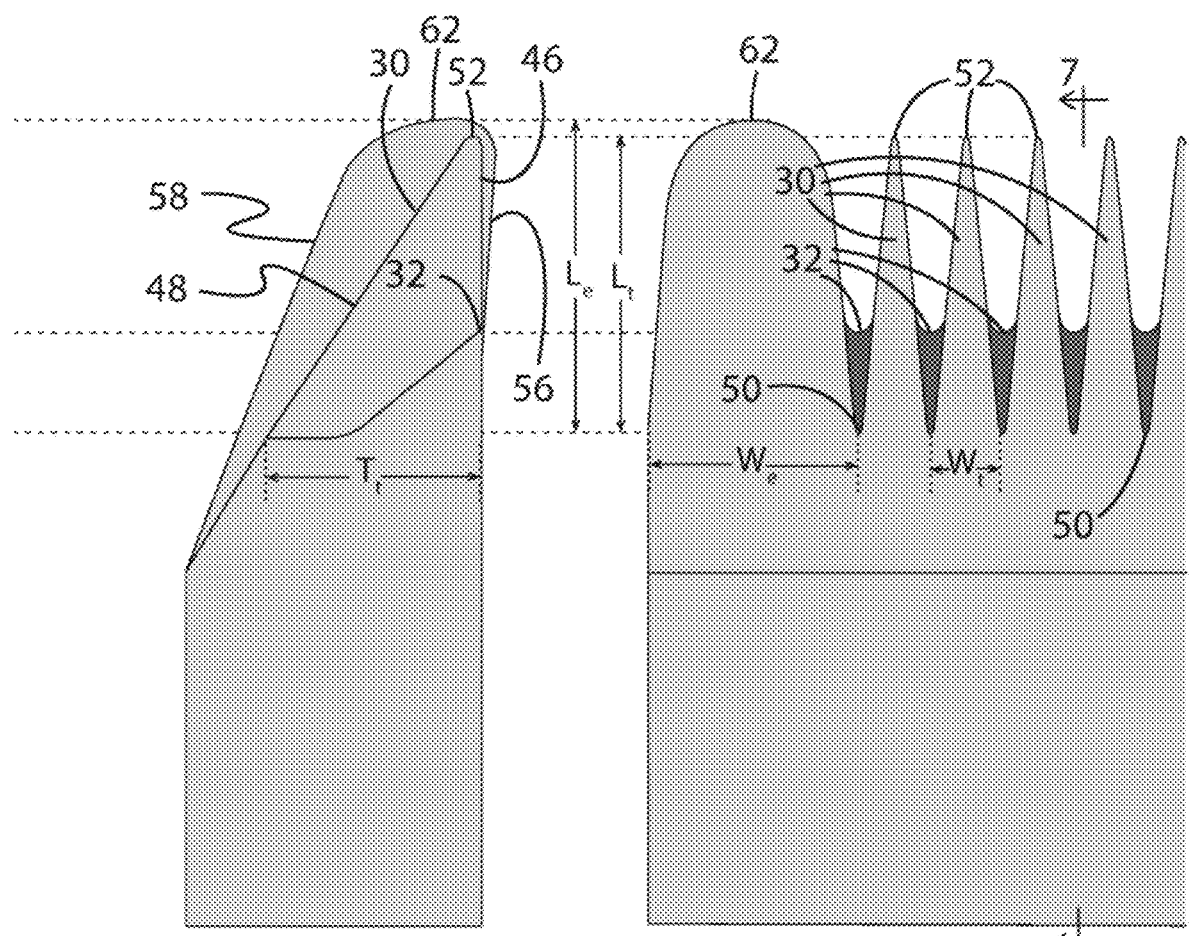
FIG. 6 is an enlarged, fragmented, rear view of the pet engageable portion of FIG. 4.
FIG. 7 is a cross-sectional view taken along the plane of line 7-7 of FIG. 6.

Each of the first, second, third, and fourth pet engageable portions 24a, 24b, 24c, 24d comprises a plurality of teeth 30 arranged in a row and a plurality of edge segments 32 with a gap between each adjacent pair of teeth. The edge segments 32 alternate with the teeth 30 and bridge the gaps between the teeth. As shown in FIG. 7, each edge segment forms an acute angle, which is preferable forty degrees, plus or minus five degrees. Each of the first, second, third, and fourth pet engageable portions 24a, 24b, 24c, 24d further comprises a first end guard 34 adjacent a first end of the row of teeth and a second end guard 36 adjacent an opposite second end of the row of teeth such that the plurality of teeth 30 of each of the first, second, third, and fourth pet engageable portions 24a, 24b, 24c, 24d are between the first and second end guards 34, 36 of such pet engageable portion. In other words, the teeth 30 of the first pet engageable portion 24a are between the end guards 34, 36 of the first pet engageable portion, the teeth 30 of the second pet engageable portion 24b are between the end guards 34, 36 of the second pet engageable portion, etc. The first, second, third, and fourth pet engageable portions 24a, 24b, 24c, 24d protrude from the head portion 26 of the handle portion 22 such that the plurality of teeth 30 of each pet engageable portion project away from the head portion and such that the rows of teeth 30 of the first, second, third and fourth pet engageable portions 24a, 24b, 24c, 24d are parallel to each other. The row of teeth 30 of the second pet engageable portion 24b is spaced a distance $X_1$ from the row of teeth of the first pet engageable portion 24a. The row of teeth 30 of the third pet engageable portion 24c is spaced a distance $X_2$ from the row of teeth of the second pet engageable portion 24b. The row of teeth 30 of the fourth pet engageable portion 24d is spaced a distance $X_3$ from the row of teeth of the third pet engageable portion 24b. Each of the distances $X_1$, $X_2$, and $X_3$ are preferably at least 0.62 inches (16 mm) and less than 1.0 inches (25.4 mm), and more preferably at least 0.75 inches (19 mm). The distances $X_1$, $X_2$, and $X_3$ may be the same or may differ. The first, second, third and fourth pet engageable portions 24a, 24b, 24c, 24d are positioned and configured to simultaneously engage loose fur in a pet's coat in a manner to remove the loose fur from the pet's coat. The head portion 26 of the handle portion 22 includes a first concave channel 40, a second concave channel 42, and a third concave channel 44. The first concave channel 40 is between the first and second pet engageable portions 24a, 24b and sized to enable a user to wipe the first channel 40 with a finger of the user to thereby remove loose fur caught between the first and second pet engageable portions. The second concave channel 42 is between the second and third pet engageable portions 24b, 24c and sized to enable a user to wipe the second channel 42 with a finger of the user to thereby remove loose fur caught between the second and third pet engageable portions. The third concave channel 44 is between the third and fourth pet engageable portions 24c, 24d and sized to enable a user to wipe the third channel 44 with a finger of the user to thereby remove loose fur caught between the second and third pet engageable portions. In the embodiment of FIGS. 1-7, each of the first, second, and third 40, 42, 44 concave channels extends from one side of the head portion 26 to the opposite side of the head portion.

Each of the first, second, and third concave channels 40, 42, 44 has a channel width and a channel length. The channel width of the first concave channel 40 may be the same as or slightly smaller than the distance $X_1$ between the first and second pet engageable portions. The channel width of the second concave channel 42 may be the same as or slightly smaller than the distance $X_2$ between the second and third pet engageable portions. The channel width of the third concave channel 44 may be the same as or slightly smaller than the distance $X_3$ between the third and fourth pet engageable portions. The channel length of each of the first, second, and third channels 40, 42, and 44, are preferably at least as long as the width of each of the pet engageable portions, and more preferably the same as the width of the head portion 26 of the handle portion 22

Referring now to FIGS. 6 and 7, each tooth 30 of the plurality of teeth 30 of each of the first, second, third, and fourth pet engageable portions 24a, 24b, 24c, 24d has a forward surface 46, a rear surface 48, a root end 50, a tip end 52 opposite its root end 50, a tooth length $L_t$ from its root end 50 to its tip end 52, a tooth thickness $T_t$ from the forward surface 46 to the rear surface 48 at the root end 50, and a tooth width $W_t$ at the root end 50. Preferably, the ratio of the tooth thickness $T_t$ to the tooth width $W_t$ (i.e., $T_t/W_t$) is at least 2/1 and not more than 4/1, more preferably at least 5/2 and not more than 7/2, and even more preferably at least 11/4 and not more than 13/4. Preferably, the ratio of tooth thickness $T_t$ to the tooth length $L_t$ (i.e., $T_t/L_t$) is at least 1/2 but not more than 1/1, more preferably at least 6/10 but not more than 9/10, and even more preferably at least 7/10 but not more than 8/10. In the embodiment of FIGS. 1-7, each of the teeth 30 has a tooth length $L_t$ of 0.19 inches±10%, a tooth thickness $T_t$ of 0.13 inches±10%, and a tooth width $W_t$ of 0.05 inches±10%. Also, the teeth 30 of each of the pet engageable portions of the embodiment of FIGS. 1-7 have tip to tip spacing (i.e., the distance between the center of the tip of one of the teeth to the center of the tip of an adjacent tooth) of 0.045 inches±10%. In an alternative embodiment, each of the teeth 30 has a tooth length $L_t$ of 0.19 inches±25%, a tooth thickness $T_t$ of 0.09 inches±25%, and a tooth width $W_t$ of 0.0325 inches±25%. Also, the teeth 30 of each of the pet engageable portions of such embodiment have tip to tip spacing (i.e., the distance between the center of the tip of one of the teeth to the center of the tip of an adjacent tooth) of 0.045 inches±25%. The teeth 30 may comprise an antimicrobial material, including antimicrobial metal alloys and/or antimicrobial polymers. The teeth 30 may also comprise a material having a greater coarseness than the material comprising the handle portion 22 (i.e., the material comprising the teeth 30 may be more coarse than the material comprising the handle portion 22). In the embodiment of FIGS. 1-7 each of the pet engageable portions is approximately 2.5 inches, but it is to be understood that each pet engageable portion could be longer or shorter.

Each of the first and second end guards 34, 36 of the first, second, third, and fourth pet engageable portions 24a, 24b, 24c, 24d, has a forward surface 56, a rear surface 58, a root end 60, a tip end 62 opposite its root end, an end guard length $L_e$ from its root end 60 to its tip end 62, and an end guard width $W_e$ at the root end 60. The tip end 62 of each of the teeth 30 may be rounded. The forward surfaces 56 of the first and second end guards 34, 36 of the first pet engageable portion 24a are more forward than the forward surfaces 46 of the plurality of teeth 30 of the first pet engageable portion 24a such that a straight line extending from the forward surface 56 of the first end guard 34 of the first pet engageable portion 24a to the forward surface 56 of the second end guard 36 of the first pet engageable portion 24a is forward of and spaced from the forward surface 46 of each of the plurality of teeth 30 of the first pet engageable portion 24a. The forward surfaces 56 of the first and second end guards 34, 36 of the second pet engageable portion 24b are more forward than the forward surfaces 46 of the plurality of teeth 30 of the second pet engageable portion 24b such that a straight line extending from the forward surface 56 of the first end guard 34 of the second pet engageable portion 24b to the forward surface 56 of the second end guard 36 of the second pet engageable portion 24b is forward of and spaced from the forward surface 46 of each of the plurality of teeth 30 of the second pet engageable portion 24b. The forward surfaces 56 of the first and second end guards 34, 36 of the third pet engageable portion 24c are more forward than the forward surfaces 46 of the plurality of teeth 30 of the third pet engageable portion 24c such that a straight line extending from the forward surface 56 of the first end guard 34 of the third pet engageable portion 24c to the forward surface 56 of the second end guard 36 of the third pet engageable portion 24c is forward of and spaced from the forward surface 46 of each of the plurality of teeth 30 of the third pet engageable portion 24c. The forward surfaces 56 of the first and second end guards 34, 36 of the fourth pet engageable portion 24d are more forward than the forward surfaces 46 of the plurality of teeth 30 of the fourth pet engageable portion 24d such that a straight line extending from the forward surface 56 of the first end guard 34 of the fourth pet engageable portion 24d to the forward surface 56 of the second end guard 36 of the fourth pet engageable portion 24d is forward of and spaced from the forward surface 46 of each of the plurality of teeth 30 of the fourth pet engageable portion 24d.

The rear surfaces 58 of the first and second end guards 34, 36 of the first pet engageable portion 24a are more rearward than the rear surfaces 48 of the plurality of teeth 30 of the first pet engageable portion 24a such that a straight line extending from the rear surface 58 of the first end guard 34 of the first pet engageable portion 24a to the rear surface 58 of the second end guard 36 of the first pet engageable portion is rearward of and spaced from the rear surface 48 of each of the plurality of teeth 30 of the first pet engageable portion 24a. The rear surfaces 58 of the first and second end guards 34, 36 of the second pet engageable portion 24b are more rearward than the rear surfaces 48 of the plurality of teeth 30 of the second pet engageable portion 24b such that a straight line extending from the rear surface 58 of the first end guard 34 of the second pet engageable portion 24b to the rear surface 58 of the second end guard 36 of the second pet engageable portion is rearward of and spaced from the rear surface 48 of each of the plurality of teeth 30 of the second pet engageable portion 24b. The rear surfaces 58 of the first and second end guards 34, 36 of the third pet engageable portion 24c are more rearward than the rear surfaces 48 of the plurality of teeth 30 of the third pet engageable portion 24c such that a straight line extending from the rear surface 58 of the first end guard 34 of the third pet engageable portion 24c to the rear surface 58 of the second end guard 36 of the third pet engageable portion is rearward of and spaced from the rear surface 48 of each of the plurality of teeth 30 of the third pet engageable portion 24c. The rear surfaces 58 of the first and second end guards 34, 36 of the fourth pet engageable portion 24d are more rearward than the rear surfaces 48 of the plurality of teeth 30 of the fourth pet engageable portion 24d such that a straight line extending from the rear surface 58 of the first end guard 34 of the fourth pet engageable portion 24d to the rear surface 58 of the second end guard 36 of the fourth pet engageable portion is rearward of and spaced from the rear surface 48 of each of the plurality of teeth 30 of the fourth pet engageable portion 24d.

In the embodiment of FIGS. 1-7, the first and second end guards 34, 36 of each pet engageable portion extend lengthwise beyond the plurality of teeth 30 of such pet engageable portion in a manner such that a straight line extending from the tip end 62 of the first end guard 34 of such pet engageable portion to the tip end 62 of the second end guard 34 of such pet engageable portion is spaced from the tip ends 52 of the plurality of teeth 30 of such pet engageable portion with the tip ends 52 of such plurality of teeth being between such line and the root ends 50 of such plurality of teeth.

In the embodiment of FIGS. 1-7, the tip end 62 of each of the first and second end guards 34, 36 of each pet engageable portion has a smallest radius of curvature and the tip end 52 of each of the plurality of teeth 30 of such pet engageable portion has a smallest radius of curvature. The smallest radius of curvature of the tip end 62 of each of the first and second end guards 34, 36 is larger than the smallest radius of curvature of the tip end 52 of each of the plurality of teeth 30 of the corresponding pet engageable portion.

To operate the pet grooming tool 20, a user grasps the hand grip portion 28 of the handle portion 22, and places the teeth 30 of the first, second, third, and fourth pet engageable portions 24a, 24b, 24c, 24d against the coat of a pet (e.g., dog, cat, horse). The user then pulls the pet grooming tool 20 generally along the longitudinal axis of the hand grip portion 28 while maintaining the teeth 30 of the first, second, third, and fourth pet engageable portions 24a, 24b, 24c, 24d against the coat of the pet such that the edge segments 32 engage loose hair of the pet and pull such loose hair from the pet without cutting or pulling non-loose hair from the pet. Hair entrapped between the first, second, third, and fourth pet engageable portions 24a, 24b, 24c, 24d can be easily removed from the pet grooming tool 20 by the user wiping the entire lengths of the first, second, and third concave channels 40, 42, 44 with the user's fingers. The size and roundedness of the end guards 34, 36 protect the pet against gouging by the plurality of teeth 30.

Another embodiment of a pet grooming tool of the present disclosure is indicated generally by reference numeral 120 in FIGS. 8-16. The above description of the pet grooming tool 20 of FIGS. 1-7 applies equally to the article of footwear 120 of FIGS. 8-16, except for the differences noted in the description of the embodiment of FIGS. 8-16. It is also to be understood that components, elements, features, or regions of the embodiment of FIGS. 8-16 have reference numbers corresponding to the reference numbers of the embodiment of FIGS. 1-7, except the reference numbers of FIGS. 8-16 include a prefix "1."

Figure 14:
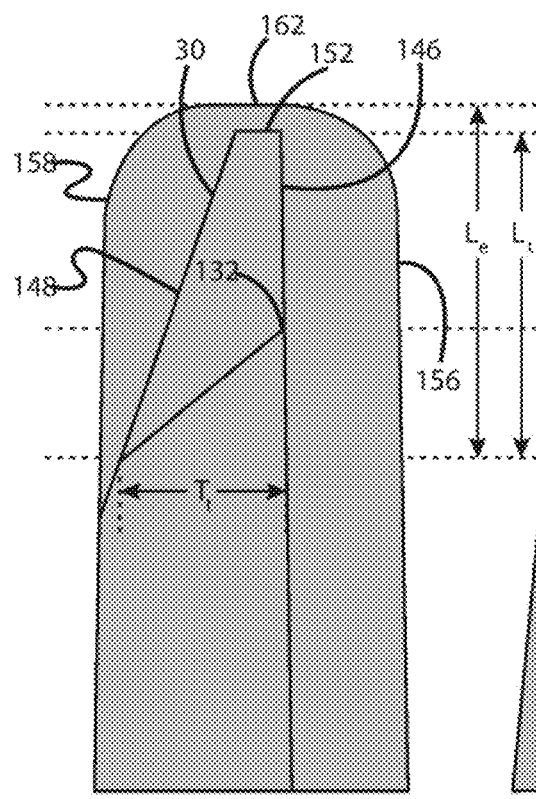
FIG. 14 is a cross-sectional view taken along the plan of line 14-14 of FIG. 13.
Figure 15:
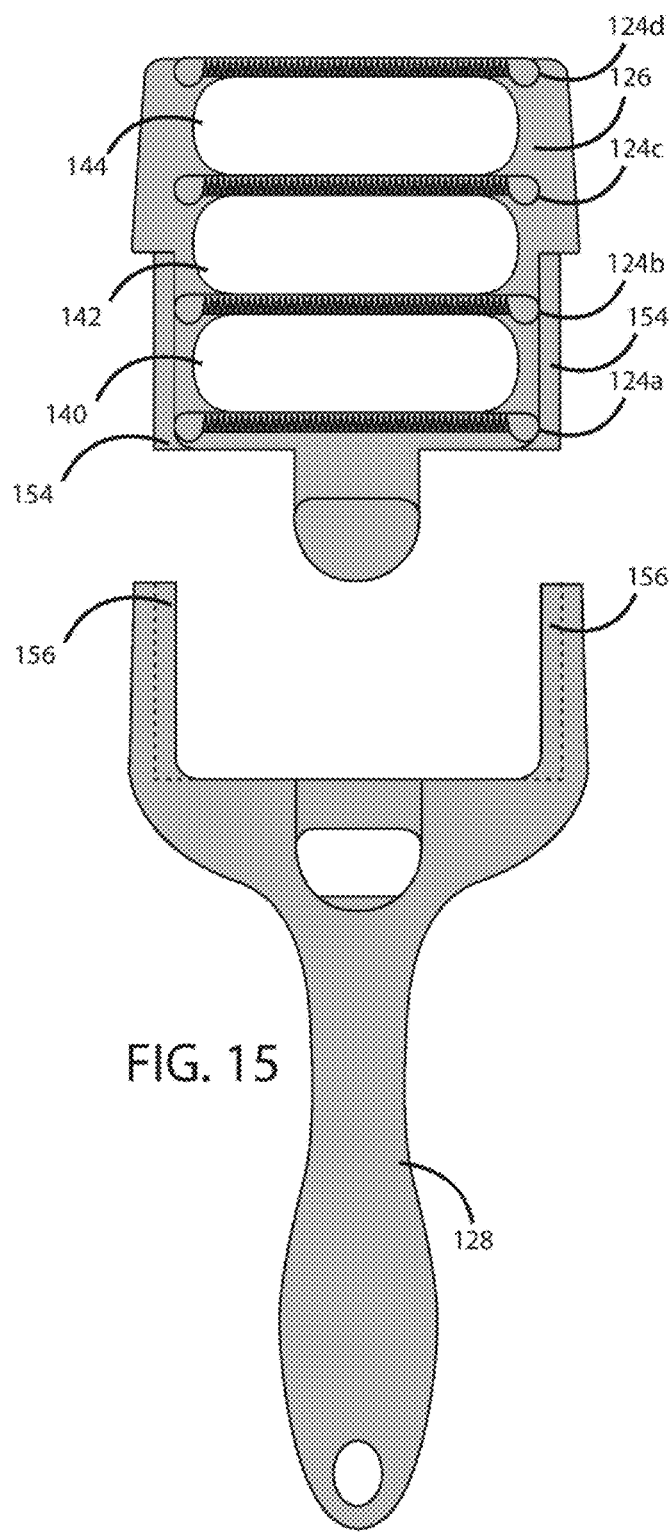
FIG. 15 is an exploded view of the pet engageable portion of FIG. 8.
Figure 16:
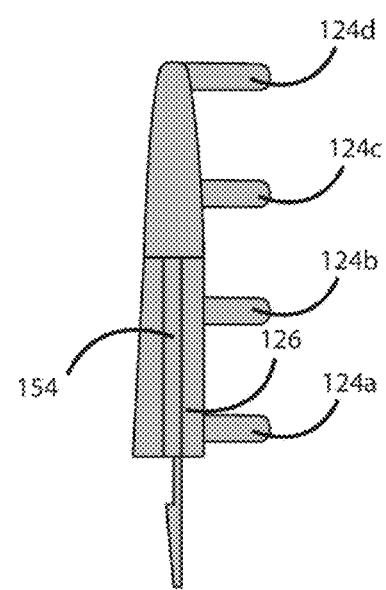
FIG. 16 is a magnified view of the head portion of the pet engageable portion of FIG. 15.

In the embodiment of FIGS. 8-16, the head portion 126 may be removable from the elongate hand grip portion 128, as shown in FIG. 15. As shown in FIGS. 8, 9, 15 and 16, the head portion 126 is releasably attached to the elongate handle grip portion 128. Side margins 154 of the head portion 126 are slidably received within slots 156 of the elongate handle grip portion 128. The head portion 126 also includes a locking tab shaped and configured to releasably engage a shoulder of the handle grip portion 128 to lock the head portion to the handle grip portion during use pet grooming tool 120.

Figure 8:
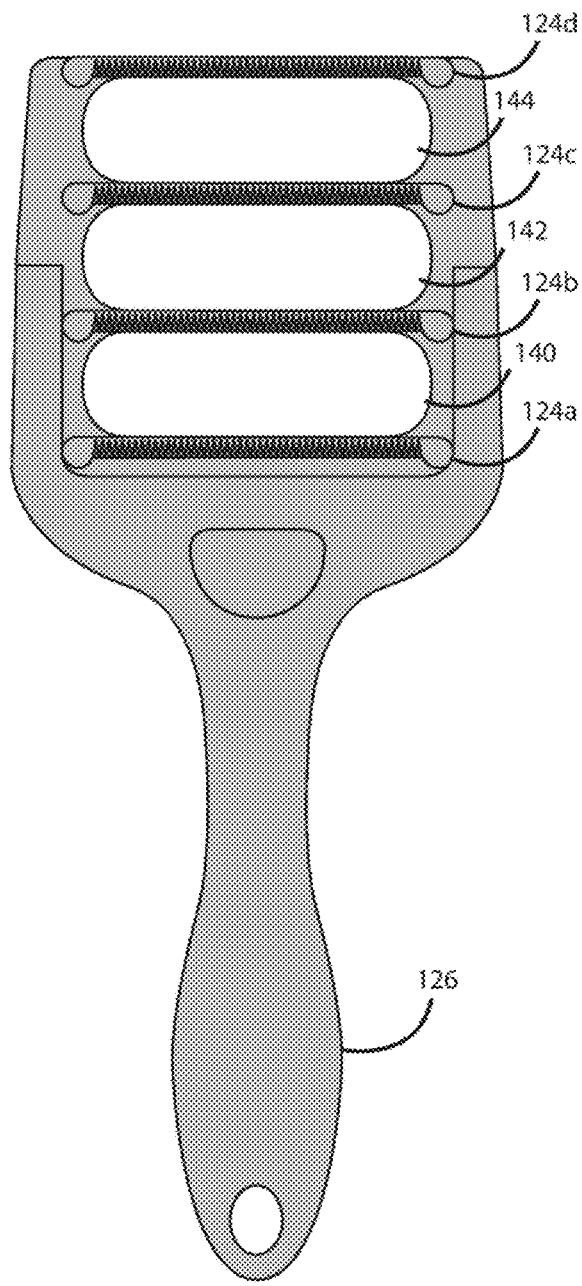
FIG. 8 is a bottom plan view of another embodiment of a pet grooming tool of the present disclosure, the pet grooming tool having first, second, third, and fourth pet engageable portions.
Figure 9:
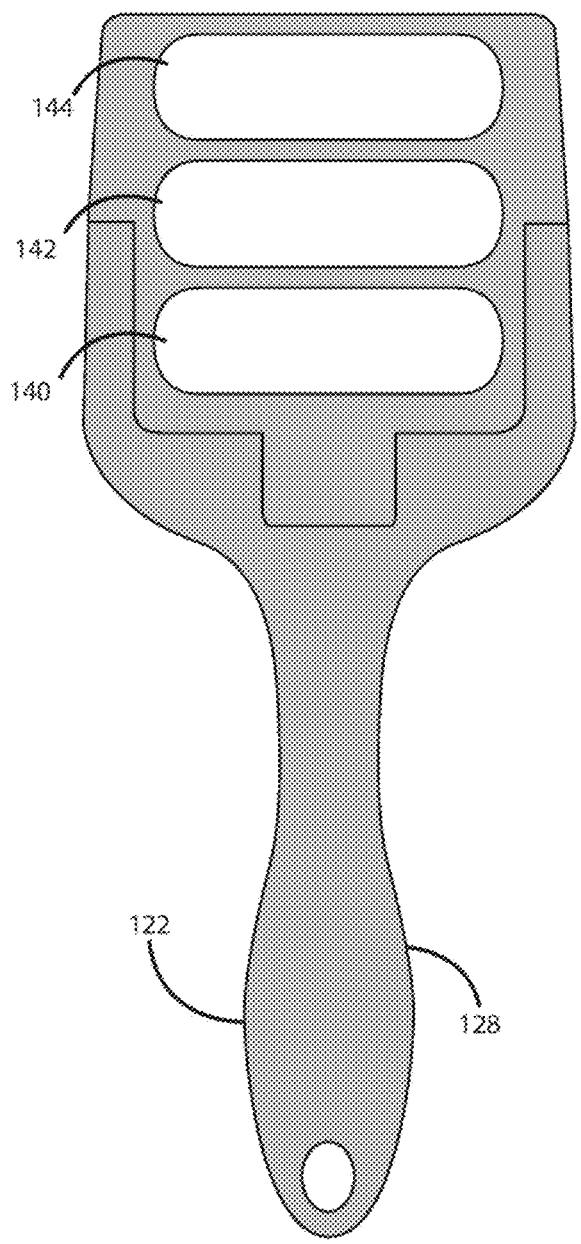
FIG. 9 is a top plan view of the pet grooming tool of FIG. 8.

The head portion 126 of the handle portion 122 is shaped and configured to enable a user to wipe between the first and second pet engageable portions 124a, 124b with a finger of the user to thereby remove loose fur caught between the first and second pet engageable portions. The head portion 126 of the handle portion 122 is also shaped and configured to enable a user to wipe between the second and third pet engageable portions 124b, 124c with a finger of the user to thereby remove loose fur caught between the second and third pet engageable portions. The head portion 126 of the handle portion 122 is shaped and configured to enable a user to wipe between the third and fourth pet engageable portions 124c, 124d with a finger of the user to thereby remove loose fur caught between the third and fourth pet engageable portions. As shown in FIGS. 8-9, this may be accomplished by through slots 140, 142, 144 in the head portion 126 located between the first and second pet engageable portions 124a, 124b, the second and third pet engageable portions, 124b, 124c, and the third and fourth pet engageable portions 124c, 124d.

Figure 13:
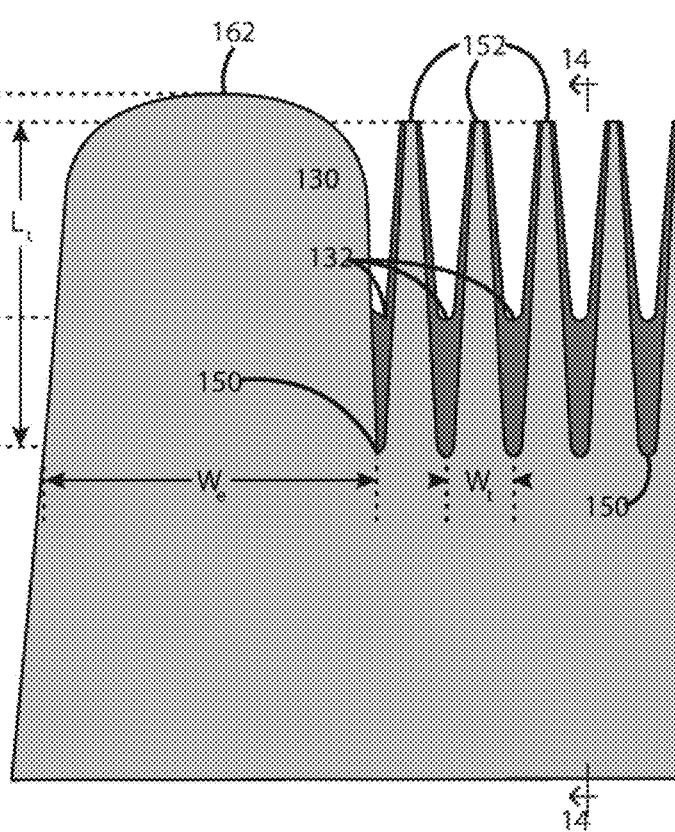
FIG. 13 is an enlarged, fragmented rear view of the pet engageable portion of FIG. 11.

As shown in FIGS. 13 and 14, each of the teeth 130 of the pet engageable portions of the embodiment of FIGS. 8-14 has a tooth length $L_t$ of 0.24 inches±10%. The teeth 130 have tip to tip spacing (i.e., the distance between the center of the tip of one of the teeth to the center of the tip of an adjacent tooth) of 0.05 inches±10%. In alternative embodiment, each of the teeth 130 of the pet engageable portions of such embodiment has a tooth length $L_t$ of 0.20 inches±25% and the teeth 130 have tip to tip spacing of 0.05 inches±25%. Each of the tip ends 152 of the teeth 130 are blunt, and preferably flat, as shown in FIGS. 13-14. Each tooth of the plurality of teeth 130 slopes such that the angle formed by the intersection of the sides of adjacent teeth is approximately 10°.

In view of the foregoing, it should be appreciated that the invention has several advantages over the prior art.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A pet grooming tool for grooming a furry pet, the pet grooming tool comprising:
   a handle portion having a head portion;
   a pet engageable portion secured to the head portion, the pet engageable portion comprising a plurality of teeth arranged in a row and a plurality of edge segments with a gap between each adjacent pair of teeth, the edge segments alternating with the teeth and bridging the gaps between the teeth, the pet engageable portion further comprising a first end guard adjacent a first end of the row of teeth and a second end guard adjacent an opposite second end of the row of teeth such that the plurality of teeth are between the first and second end guards;
   the pet engageable portion protruding from the head portion of the handle portion such that the plurality of teeth of each pet engageable portion project away from the head portion;
   each tooth of the plurality of teeth having a forward surface, a rear surface, a root end, a tip end opposite its root end, a tooth length from its root end to its tip end, a tooth thickness from the forward surface to the rear surface at the root end, and a tooth width at the root end;
   each tooth of the plurality of teeth having a ratio of the tooth thickness to the tooth width of at least 2/1 and not more than 4/1; and
   wherein each tooth of the plurality of teeth has a tooth length of 0.19 inches±10%, a tooth thickness of 0.13 inches±10%, and a tooth width of 0.05 inches±10%.

2. The pet grooming tool of claim 1 wherein each tooth of the plurality of teeth has a ratio of the tooth thickness to the tooth width of at least 5/2 and not more than 7/2.

3. The pet grooming tool of claim 2 wherein each tooth of the plurality of teeth has a ratio of the tooth thickness to the tooth length of at least 6/10 but not more than 9/10.

4. The pet grooming tool of claim 1 wherein each tooth of the plurality of teeth has a ratio of the tooth thickness to the tooth width of at least 11/4 and not more than 13/4.

5. The pet grooming tool of claim 4 wherein each tooth of the plurality of teeth has a ratio of the tooth thickness to the tooth length of at least 7/10 but not more than 8/10.

6. The pet grooming tool of claim 1 wherein the tip to tip spacing of each adjacent pair of teeth is 0.045 inches±10%.

7. A pet grooming tool for grooming a furry pet, the pet grooming tool comprising:
   a handle portion having a head portion;
   a pet engageable portion secured to the head portion, the pet engageable portion comprising a plurality of teeth arranged in a row and a plurality of edge segments with a gap between each adjacent pair of teeth, the edge segments alternating with the teeth and bridging the gaps between the teeth, the pet engageable portion further comprising a first end guard adjacent a first end of the row of teeth and a second end guard adjacent an opposite second end of the row of teeth such that the plurality of teeth are between the first and second end guards;
   the pet engageable portion protruding from the head portion of the handle portion such that the plurality of teeth of each pet engageable portion project away from the head portion;
   each tooth of the plurality of teeth having a forward surface, a rear surface, a root end, a tip end opposite its root end, a tooth length from its root end to its tip end, a tooth thickness from the forward surface to the rear surface at the root end, and a tooth width at the root end;
   each tooth of the plurality of teeth having a ratio of the tooth thickness to the tooth width of at least 2/1 and not more than 4/1; and
   wherein each tooth of the plurality of teeth has a tooth length of 0.24 inches±10%, a tooth thickness of 0.13 inches±10%, and a tooth width of 0.05 inches±10%.

8. The pet grooming tool of claim 7 wherein the tip to tip spacing of each adjacent pair of teeth is 0.05 inches±10%.

9. The pet grooming tool of claim 8 wherein the tip end of each tooth is blunt.

10. The pet grooming tool of claim 8 wherein the tip end of each tooth is rounded.

\* \* \* \* \*